United States Patent
Elshafie et al.

(10) Patent No.: US 11,831,378 B2
(45) Date of Patent: Nov. 28, 2023

(54) REPORTING BELOW A MINIMUM MODULATION AND CODING SCHEME

(71) Applicant: QUALCOMM Incorporated, San Diego, CA (US)

(72) Inventors: Ahmed Elshafie, San Diego, CA (US); Seyedkianoush Hosseini, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/446,253

(22) Filed: Aug. 27, 2021

(65) Prior Publication Data

US 2023/0067166 A1 Mar. 2, 2023

(51) Int. Cl.
*H04B 7/06* (2006.01)
*H04W 72/21* (2023.01)
*H04L 1/00* (2006.01)

(52) U.S. Cl.
CPC ........... *H04B 7/0626* (2013.01); *H04L 1/001* (2013.01); *H04L 1/0016* (2013.01); *H04W 72/21* (2023.01)

(58) Field of Classification Search
CPC .......................... H04B 7/0626; H04W 72/21; H04W 72/1263; H04L 1/0016
See application file for complete search history.

(56) References Cited

U.S. PATENT DOCUMENTS

2011/0243079 A1* 10/2011 Chen .................... H04B 7/0639
    370/329
2019/0253121 A1* 8/2019 Islam ................... H04B 7/0626

OTHER PUBLICATIONS

R1-2107584 "On enhanced SB CQI reporting granularity and delta-MCS" 3GPP WG1 #106-e Aug. 16-27, 2021 (Year: 2021).*
Basilashvili, Grigol "Study of Spectral Efficiency for LTE Network" ASRJETS vol. 29, No. 1 pp. 21-32 (Year: 2017).*
Huawei, et al., "MCS/CQI Design for URLLC Transmission", R1-1803661, 3GPP TSG RAN WG1 Meeting #92bis, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16-20, 2018, Apr. 15, 2018 (Apr. 15, 2018), XP051425958, 12 Pages, Sections 3.3, 3.4 and 4, p. 5-p. 9, figure 3, tables 2, 3, 4.

(Continued)

*Primary Examiner* — Basil Ma
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, channel state information (CSI) feedback indicating a modulation and coding scheme (MCS) associated with a spectral efficiency below a minimum MCS index in a spectral efficiency table. The UE may receive, from the base station, a downlink transmission including a number of resource blocks (RBs), wherein the number of RBs is based at least in part on the spectral efficiency associated with the MCS indicated in the CSI feedback. Numerous other aspects are described.

30 Claims, 9 Drawing Sheets

(56) References Cited

OTHER PUBLICATIONS

Intel Corporation: "On Enhanced SB CQI Reporting Granularity and Delta-MCS Reporting", R1-2107584, 3GPP TSG RAN WG1 #106-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16-27, 2021, Aug. 7, 2021 (Aug. 7, 2021), XP052038493, 5 Pages, Sections 2-3, p. 1-p. 3, figures 1, 2.
International Search Report and Written Opinion—PCT/US2022/073414—ISA/EPO—dated Oct. 20, 2022.
Qualcomm Incorporated: "CSI Enhancement for IOT and URLLC", 3GPP TSG RAN WG1 #106-e, R1-2107337, 3rd Generation Partnership Project, Mobile Competence Centre, 650, Route Des Lucioles, F-06921, Sophia-Antipolis Cedex, France, vol. RAN WG1, No. e-Meeting, Aug. 16-27, 2021, Aug. 7, 2021, XP052038289, 10 Pages, Sections 2, 4.
ZTE, et al., "Considerations on CQI IMCS Table(s) and Related Aspects for URLLC", R1-1805515, 3GPP TSG RAN WG1 Meeting #92bis, 3rd Generation Partnership Project (3GPP), Mobile Competence Centre, 650, Route Des Lucioles, F-06921 Sophia-Ant, vol. RAN WG1, No. Sanya, China, Apr. 16-20, 2018, Apr. 16, 2018 (Apr. 16, 2018), XP051427545, 21 Pages, Section 3, p. 8-p. 13, figures 5-6, tables 2-7 p. 6.

* cited by examiner

REPORTING BELOW A MINIMUM MODULATION AND CODING SCHEME

FIELD OF THE DISCLOSURE

Aspects of the present disclosure generally relate to wireless communication and to techniques and apparatuses for reporting below a minimum modulation and coding scheme (MCS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting, to a base station, channel state information (CSI) feedback indicating a modulation and coding scheme (MCS) associated with a spectral efficiency below a minimum MCS index in a spectral efficiency table. The method may include receiving, from the base station, a downlink transmission including a number of resource blocks (RBs), wherein the number of RBs is based at least in part on the spectral efficiency associated with the MCS indicated in the CSI feedback.

Some aspects described herein relate to a method of wireless communication performed by a base station. The method may include receiving, from a UE, CSI feedback indicating an MCS associated with a spectral efficiency below a minimum MCS index in a spectral efficiency table. The method may include transmitting, to the UE, a downlink transmission including a number of RBs, wherein the number of RBs is based at least in part on the spectral efficiency associated with the MCS indicated in the CSI feedback.

Some aspects described herein relate to a UE for wireless communication. The user equipment may include a memory and one or more processors coupled to the memory. The one or more processors may be configured to transmit, to a base station, CSI feedback indicating an MCS associated with a spectral efficiency below a minimum MCS index in a spectral efficiency table. The one or more processors may be configured to receive, from the base station, a downlink transmission including a number of RBs, wherein the number of RBs is based at least in part on the spectral efficiency associated with the MCS indicated in the CSI feedback.

Some aspects described herein relate to a base station for wireless communication. The base station may include a memory and one or more processors coupled to the memory. The one or more processors may be configured to receive, from a UE, CSI feedback indicating an MCS associated with a spectral efficiency below a minimum MCS index in a spectral efficiency table. The one or more processors may be configured to transmit, to the UE, a downlink transmission including a number of RBs, wherein the number of RBs is based at least in part on the spectral efficiency associated with the MCS indicated in the CSI feedback.

Some aspects described herein relate to a non-transitory computer-readable medium that stores a set of instructions for wireless communication by a UE. The set of instructions, when executed by one or more processors of the UE, may cause the UE to transmit, to a base station, CSI feedback indicating an MCS associated with a spectral efficiency below a minimum MCS index in a spectral efficiency table. The set of instructions, when executed by one or more processors of the UE, may cause the UE to receive, from the base station, a downlink transmission including a number of RBs, wherein the number of RBs is based at least in part on the spectral efficiency associated with the MCS indicated in the CSI feedback.

Some aspects described herein relate to a non-transitory computer-readable medium that stores a set of instructions for wireless communication by a base station. The set of instructions, when executed by one or more processors of the base station, may cause the base station to receive, from a UE, CSI feedback indicating an MCS associated with a spectral efficiency below a minimum MCS index in a spectral efficiency table. The set of instructions, when executed by one or more processors of the base station, may cause the base station to transmit, to the UE, a downlink transmission including a number of RBs, wherein the number of RBs is based at least in part on the spectral efficiency associated with the MCS indicated in the CSI feedback.

Some aspects described herein relate to an apparatus for wireless communication. The apparatus may include means for transmitting, to a base station, CSI feedback indicating an MCS associated with a spectral efficiency below a minimum MCS index in a spectral efficiency table. The apparatus may include means for receiving, from the base station, a downlink transmission including a number of RBs, wherein the number of RBs is based at least in part on the spectral efficiency associated with the MCS indicated in the CSI feedback.

Some aspects described herein relate to an apparatus for wireless communication. The apparatus may include means for receiving, from a UE, CSI feedback indicating an MCS associated with a spectral efficiency below a minimum MCS index in a spectral efficiency table. The apparatus may include means for transmitting, to the UE, a downlink transmission including a number of RBs, wherein the number of RBs is based at least in part on the spectral efficiency associated with the MCS indicated in the CSI feedback.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
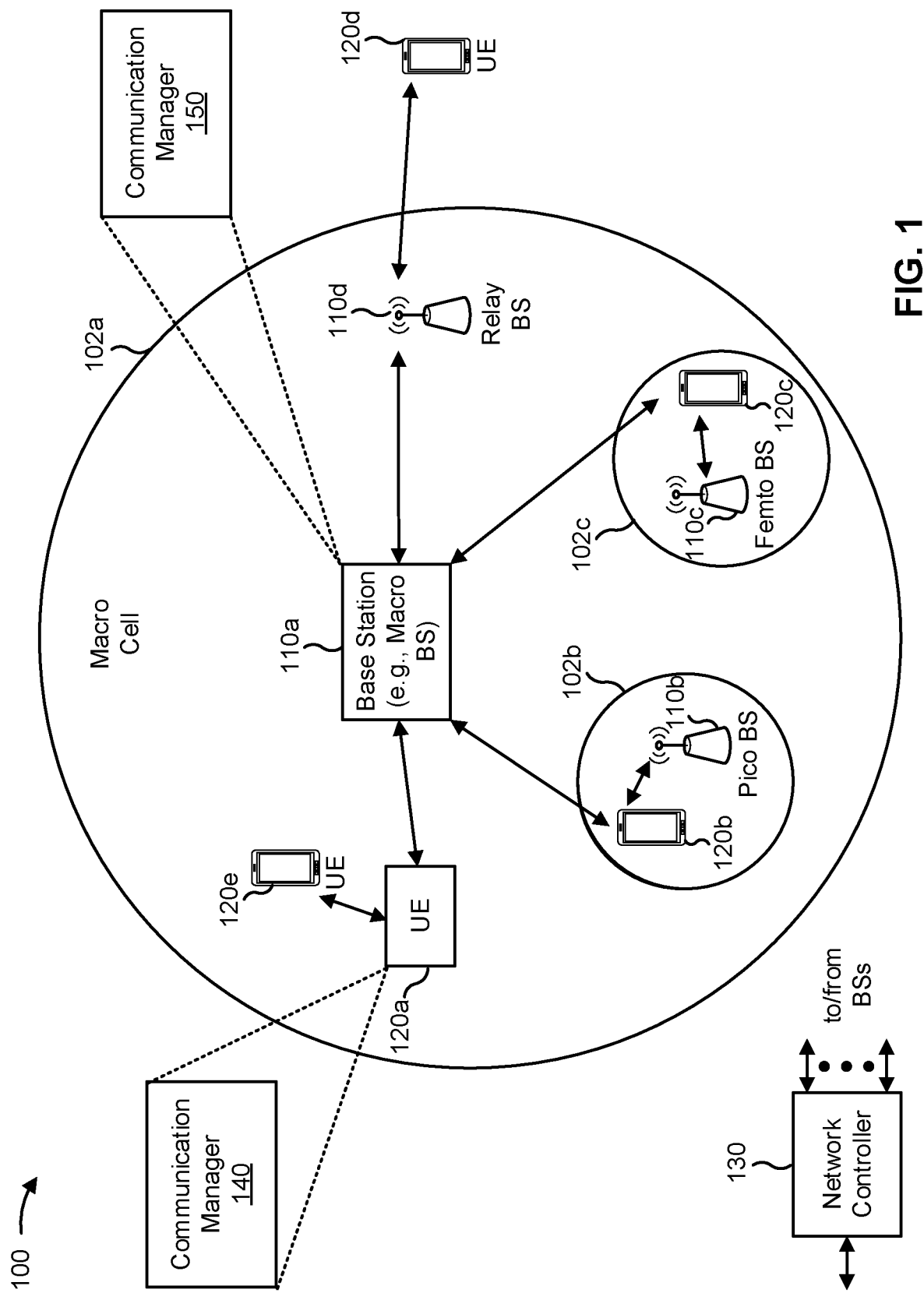
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a base station 110, channel state information (CSI) feedback indicating a modulation and coding scheme (MCS) associated with a spectral efficiency below a minimum MCS index in a spectral efficiency table; and receive, from the base station 110, a downlink transmission including a number of resource blocks (RBs), wherein the number of RBs is based at least in part on the spectral efficiency associated with the MCS indicated in the CSI feedback. Additionally, or alternatively, the communication manager 140 may perform one or more other operations described herein.

In some aspects, the base station 110 may include a communication manager 150. As described in more detail elsewhere herein, the communication manager 150 may receive, from a UE 120, CSI feedback indicating an MCS associated with a spectral efficiency below a minimum MCS index in a spectral efficiency table; and transmit, to the UE 120, a downlink transmission including a number of RBs, wherein the number of RBs is based at least in part on the spectral efficiency associated with the MCS indicated in the CSI feedback. Additionally, or alternatively, the communication manager 150 may perform one or more other operations described herein.

As indicated above, FIG. 1 is provided as an example. Other examples may differ from what is described with regard to FIG. 1.

Figure 2:
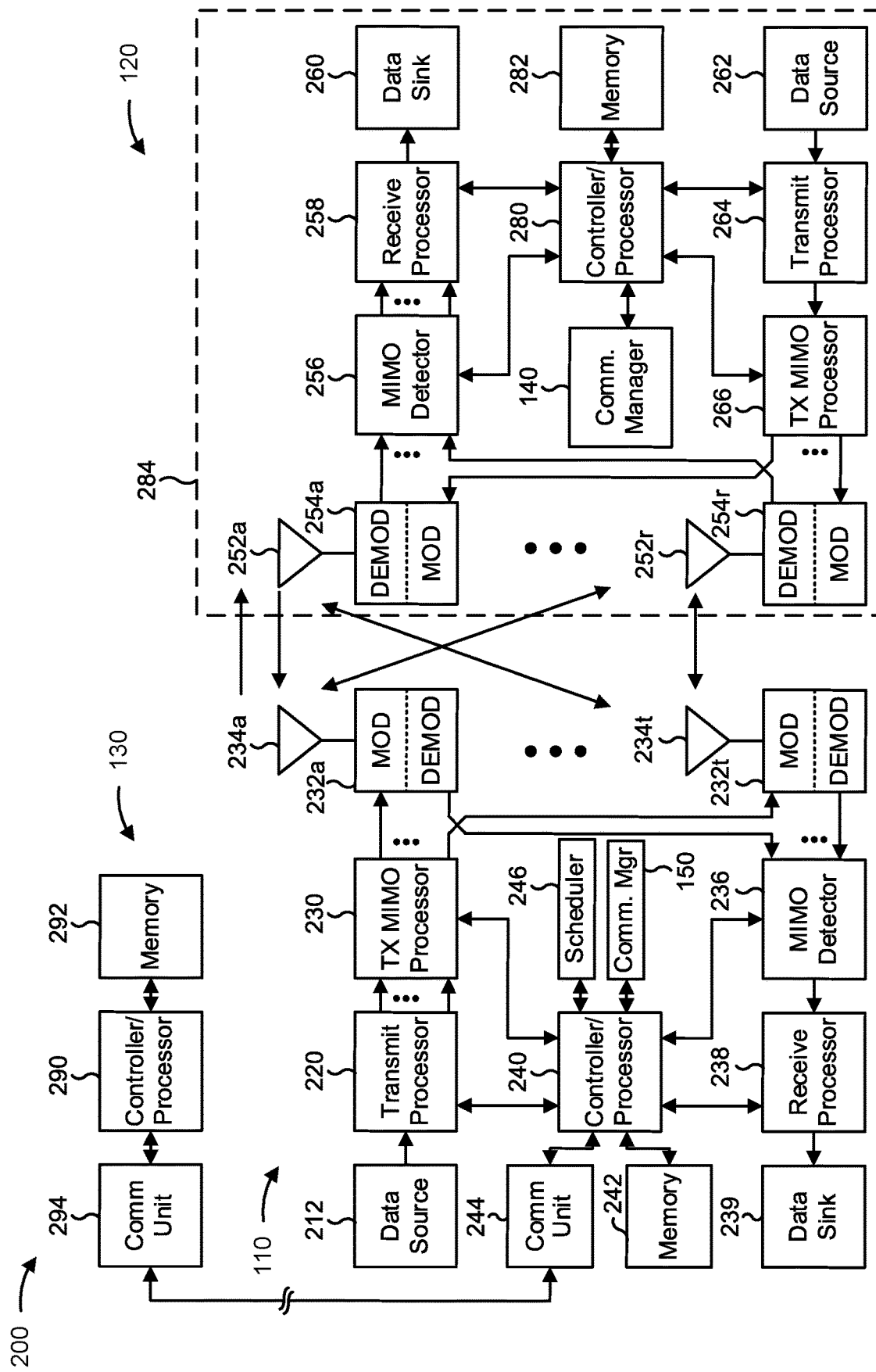
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with reporting below a minimum MCS, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for transmitting, to the base station 110, CSI feedback indicating an MCS associated with a spectral efficiency below a minimum MCS index in a spectral efficiency table; and/or means for receiving, from the base station 110, a downlink transmission including a number of RBs, wherein the number of RBs is based at least in part on the spectral efficiency associated with the MCS indicated in the CSI feedback. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from the UE 120, CSI feedback indicating an MCS associated with a spectral efficiency below a minimum MCS index in a spectral efficiency table; and/or means for transmitting, to the UE 120, a downlink transmission including a number of RBs, wherein the number of RBs is based at least in part on the spectral efficiency associated with the MCS indicated in the CSI feedback. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
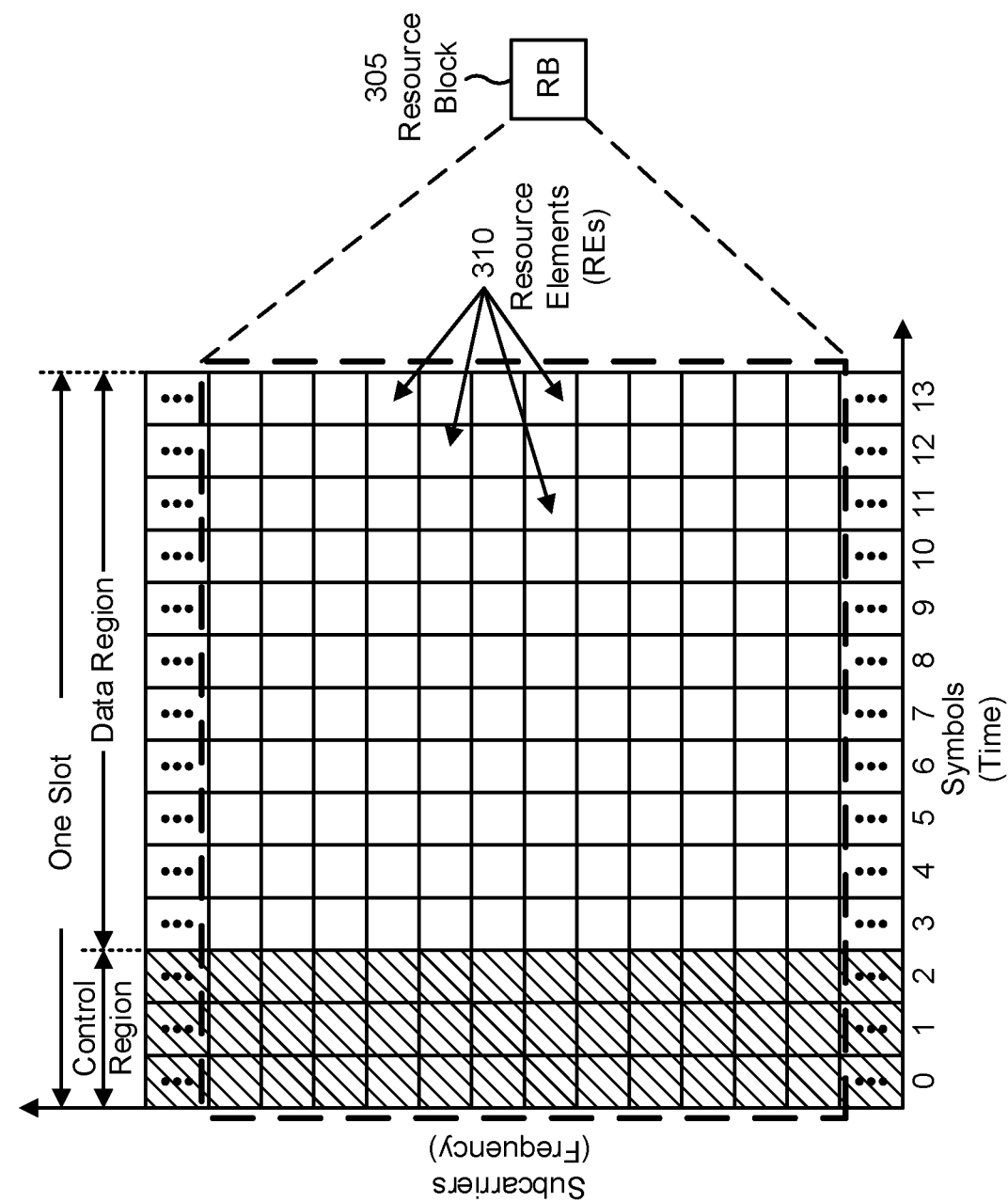
FIG. 3 is a diagram illustrating an example of a slot format, in accordance with the present disclosure.

FIG. 3 is a diagram illustrating an example of a slot format, in accordance with the present disclosure. As shown in FIG. 3, time-frequency resources in a radio access network may be partitioned into resource blocks, shown by a single RB 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

In a wireless network, a transmission may generally include a number of RBs 305 that depend on an MCS used for the transmission. For example, for a transmission having a given transport block (TB) size, a number of RBs 305 included in the transmission may be determined by the following expression:

$$\frac{N_{info}}{L * S * N_{RE}}$$

where $N_{info}$ is a number of information bits included in the transmission (e.g., 256 bits for ultra-reliable low-latency communication (URLLC) traffic), L is a number of layers used to perform the transmission, S is a spectral efficiency mapped to the MCS used for the transmission, and $N_{RE}$ is a number of REs 310 per RB 305. Accordingly, in some cases, a relatively lower MCS that is associated with a lower spectral efficiency may be used to increase the number of RBs 305 included in a transmission, which may increase reliability of the transmission. For example, in default MCS table used for 64 quadrature amplitude modulation (QAM), MCS index 1 is associated with a spectral efficiency of 0.3066 and MCS index 0 is associated with a spectral efficiency of 0.2344. As a result, using a lower MCS may result in a lower spectral efficiency, which may increase the number of RBs 305 included in a transmission that has a fixed TB size and is transmitted using the same number of layers and the same number of REs 310 per RB 305

As indicated above, FIG. 3 is provided as an example. Other examples may differ from what is described with respect to FIG. 3.

Figure 4:
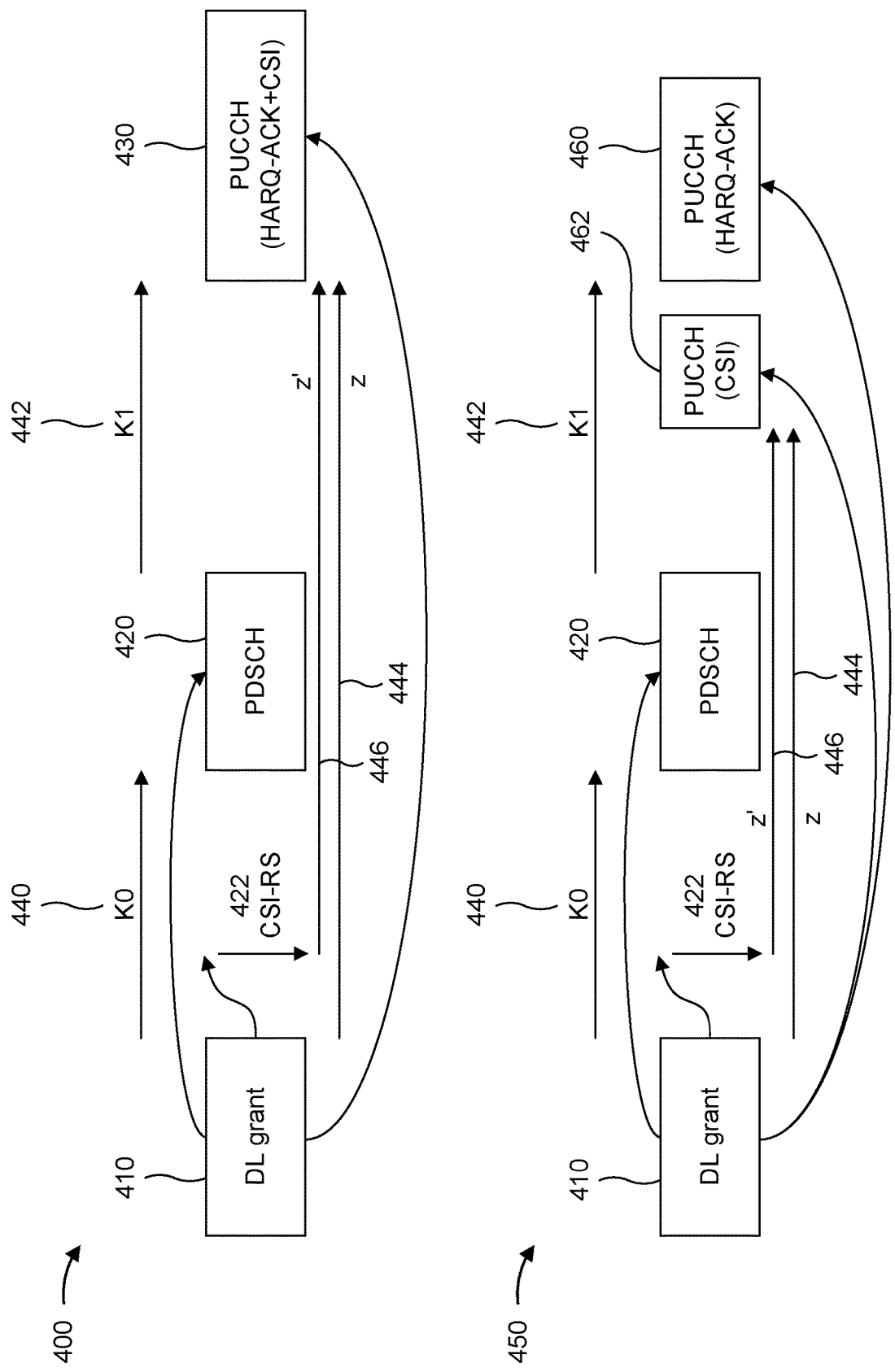
FIG. 4 is a diagram illustrating an example of a downlink grant triggering an aperiodic channel state information (CSI) report on a physical uplink control channel (PUCCH), in accordance with the present disclosure.

FIG. 4 is a diagram illustrating an example 400 of a downlink grant triggering an aperiodic CSI report on a physical uplink control channel (PUCCH), in accordance with the present disclosure. For example, in a wireless network, a CSI report transmitted from a UE to a base station can include periodic CSI feedback transmitted in a PUCCH, semi-persistent CSI feedback transmitted in a PUCCH or a physical uplink shared channel (PUSCH), or aperiodic CSI feedback that is transmitted in a PUSCH and triggered by an uplink grant. Consequently, in cases where aperiodic CSI feedback is limited to transmission in a PUSCH following an uplink grant, a UE may experience increased latency and reduced reliability (e.g., because the aperiodic CSI feedback cannot be transmitted until a PUSCH resource is available, which may increase latency, and the base station may be unaware of a need to adjust downlink transmission parameters until the aperiodic CSI feedback is received, which may reduce reliability). Accordingly, in some wireless networks, a UE may be configured to transmit an aperiodic CSI report to a base station in a PUCCH that is triggered by a downlink grant, where the CSI feedback carried in the aperiodic CSI report may include measurements based on a CSI reference signal (CSI-RS) or a PDSCH (e.g., based on a DMRS included in the PDSCH).

For example, FIG. 4 illustrates a first technique 400 in which a downlink grant 410 (which may be carried in downlink control information (DCI)) schedules a PDSCH 420 and triggers an aperiodic CSI report based on one or more reference signal transmissions to enable downlink channel estimation. For example, in addition to scheduling the PDSCH 420, the downlink grant 410 may trigger a CSI-RS 422 prior to the PDSCH 420, such that a UE may use the CSI-RS 422 for downlink channel estimation by obtaining one or more CSI measurements that relate to downlink channel conditions. Additionally, or alternatively, the downlink grant 410 may trigger aperiodic CSI reporting based on a decoding of the PDSCH 420, in which case the UE may use a DMRS included in the PDSCH 420 to perform downlink channel estimation and obtain the CSI measurements that relate to downlink channel conditions. As further shown in FIG. 4, the downlink grant 410 may trigger an aperiodic CSI report that includes CSI measurements associated with the CSI-RS 422 and/or the DMRS included in the PDSCH 420 (e.g., to reduce a latency or increase reliability of CSI reporting). For example, the downlink grant 410 may include a CSI trigger field that includes one or more bits to indicate a CSI trigger state that includes a CSI report setting and a CSI-RS resource setting.

In the first technique 400 shown in FIG. 4, the downlink grant 410 may trigger the aperiodic CSI report and hybrid automatic repeat request acknowledgement (HARQ-ACK) feedback for the PDSCH 420 (e.g., to indicate whether the UE successfully received and/or decoded the PDSCH 420) in a common PUCCH resource 430. Accordingly, the downlink grant 410 may indicate various parameters to indicate resource allocations in a time domain for various transmissions that are scheduled or triggered by the downlink grant 410. For example, as shown, the downlink grant 410 may indicate a K0 parameter 440 that defines an offset between a downlink slot in which a physical downlink control channel (PDCCH) carrying the downlink grant 410 is received and a downlink slot in which the PDSCH 420 is scheduled. As further shown, the downlink grant 410 may indicate a K1 parameter 442 that defines an offset between the downlink slot in which the PDSCH 420 is scheduled and the common PUCCH resource 430 to carry the HARQ-ACK feedback for the PDSCH 420 and the aperiodic CSI report that is based on measurements of the CSI-RS 422 and/or the decoding of the PDSCH 420.

Furthermore, in some aspects, the downlink grant 410 may indicate one or more timing parameters associated with the aperiodic CSI report. For example, in some aspects, the downlink grant 410 may indicate a z parameter 444 that defines an offset between the downlink slot in which the downlink grant 410 is received and the common PUCCH resource 430 carrying the aperiodic CSI report. Additionally, or alternatively, the downlink grant 410 may indicate a z' parameter 446 that defines an offset between the CSI-RS 422 and the common PUCCH resource 430 configured to carry the aperiodic CSI report. In this way, the UE may determine a time domain resource allocation that indicates the respective locations in time for the PDSCH 420 scheduled by the downlink grant 410, the CSI-RS 422 triggered by the downlink grant 410 (if applicable), the PUCCH resource 430 to carry the HARQ-ACK feedback, and/or the PUCCH resource 430 to carry the aperiodic CSI report, among other examples.

Figure 5:
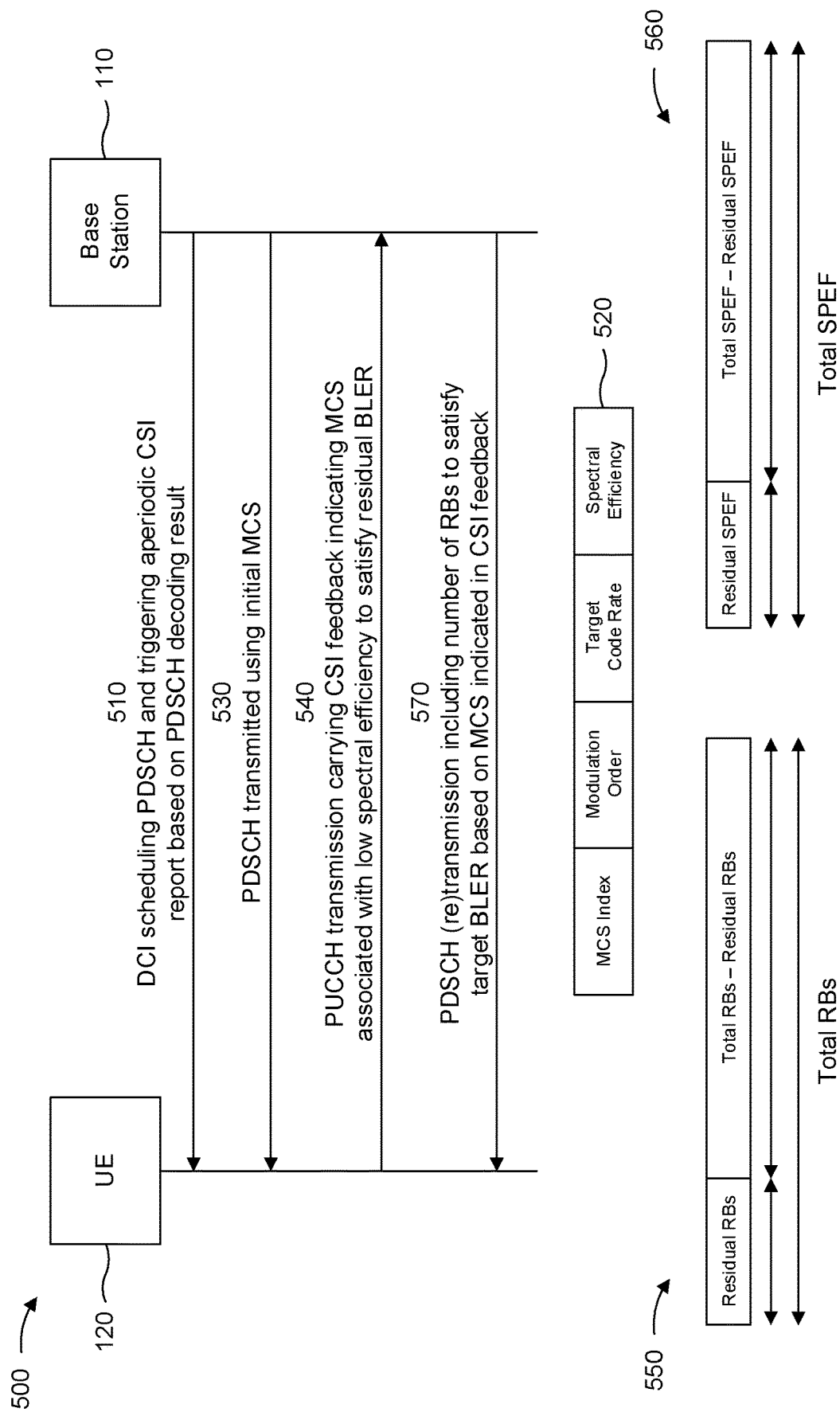
FIG. 5 is a diagram illustrating an example associated with reporting below a minimum modulation and coding scheme (MCS), in accordance with the present disclosure.

Additionally, or alternatively, in a second technique 450 shown in FIG. 5, the downlink grant 410 may trigger the aperiodic CSI report and HARQ-ACK feedback for the PDSCH 420 in separate PUCCH resources 460, 462. In such cases, as shown, the downlink grant 410 may indicate the z parameter 444 to define an offset between the downlink slot in which the PDCCH carrying the downlink grant 410 is received and the PUCCH resource 462 to carry the aperiodic CSI report. Additionally, or alternatively, if the aperiodic CSI report is to include CSI feedback based on a CSI-RS 422, the downlink grant 410 may indicate a z' parameter 446 to define an offset between the CSI-RS 422 triggered by the downlink grant 410 and the PUCCH resource 462 to carry the aperiodic CSI report. In this way, the UE may determine, in the time domain, the respective locations of the PDSCH 420, the CSI-RS 422 triggered by the downlink grant 410 (if applicable), and the PUCCH resources 460, 462 that are allocated to carry the HARQ-ACK feedback and the aperiodic CSI report, among other examples.

In some aspects, as described herein, a wireless network may support using the downlink grant 410 to trigger transmission of an aperiodic CSI report in a PUCCH resource 430 or 462 in order to increase reliability and/or reduce latency based on a decoding result associated with the PDSCH 420. For example, the downlink grant 410 may trigger aperiodic CSI reporting to satisfy URLLC requirements, which include stringent reliability requirements (e.g., a block error rate (BLER) no worse than 1e−5) with a strict end-to-end latency (e.g., 1 millisecond (ms) or less). For example, in a URLLC HARQ procedure (sometimes referred to as Turbo-HARQ), a base station may use periodic CSI reports to select an initial MCS to satisfy a target BLER of 1e−1 for an initial (new) transmission of a PDSCH 420 to a UE, and the base station may use an aperiodic CSI report that the UE transmits along with HARQ feedback (e.g., ACK or negative acknowledgement (NACK) feedback) to select an MCS to satisfy a target BLER of 1e−4 such that the initial transmission of the PDSCH 420 and a first retransmission of the PDSCH 420 satisfy the target BLER of 1e−5. In such cases, the UE may receive the initial transmission of the PDSCH 420, which the base station transmits using a scheduled MCS indicated in the downlink grant 410, and the UE may attempt to decode the initial transmission of the PDSCH 420. In cases where the decoding is unsuccessful, the UE may determine an MCS that is needed to decode the PDSCH 420. For example, the UE may calculate an accumulated capacity based at least in part on a signal to interference plus noise ratio (SINR) of the PDSCH 420, which may be mapped to an MCS needed to decode the PDSCH 420 based on a difference between the accumulated capacity and a target capacity of the PDSCH 420. The UE may then transmit uplink control information (UCI) that indicates NACK feedback for the communication (e.g., due to unsuccessful decoding of the PDSCH 420) and aperiodic CSI feedback that indicates the MCS needed to decode the PDSCH 420. For example, in cases where the HARQ feedback includes a NACK based on an unsuccessful decoding of the PDSCH 420, the CSI feedback may indicate that the MCS is to be lowered by a delta such that the retransmission of the PDSCH 420 may include a larger number of RBs to satisfy a residual BLER. Alternatively, in cases where the HARQ feedback includes an ACK based on a successful decoding, the CSI feedback may indicate that the MCS is to be increased by a delta.

When aperiodic CSI feedback is used to indicate an MCS for a next downlink transmission (e.g., a new PDSCH or a PDSCH retransmission), the UE may generally compute a target spectral efficiency that may achieve a target BLER for the next downlink transmission, and the target spectral efficiency may be mapped to an MCS index in one or more MCS tables. For example, in a default MCS table used for 64 QAM transmissions, a minimum MCS (e.g., MCS index 0) is associated with a modulation order of 2, a target code rate of 120, and a spectral efficiency of 0.2344, which results in a number of RBs determined by the following expression:

$$\frac{N_{info}}{L*S*N_{RE}}$$

where $N_{info}$ is a number of information bits included in the transmission (e.g., 256 bits for URLLC traffic), L is the number of layers used to perform the transmission, S is the spectral efficiency mapped to the MCS used for the transmission, and $N_{RE}$ is a number of REs per RB. However, in some cases, the UE may need to request a larger RB allocation than is possible using the minimum MCS in the default MCS table. Accordingly, in some wireless networks, a low spectral efficiency MCS table may be configured (e.g., for URLLC traffic), where the minimum MCS in the default MCS table is mapped to MCS index six (6) in the low spectral efficiency MCS table, and MCS indexes from zero (0) to five (5) provide lower spectral efficiencies that may be mapped to larger RB allocations to provide more granularity below the minimum MCS in the default MCS table. However, in cases where the UE computes a spectral efficiency that is lower than the minimum MCS index in the low spectral efficiency table, the aperiodic CSI feedback from the UE can only indicate the minimum MCS index in the low spectral efficiency table or a difference between the current scheduled MCS and the minimum MCS index in the low spectral efficiency table. In such cases, although using the minimum MCS index in the low spectral efficiency table to perform the next transmission may result in an increase in the number of RBs, the UE may need a larger increase in the number of RBs to achieve the target BLER (e.g., 1e−5 in the case of URLLC traffic). In other words, if the UE reports the minimum MCS index in the low spectral efficiency table, the base station may be unable to appropriately determine how many RBs to add to the next transmission because any MCS information below the minimum MCS index in the low spectral efficiency table is mapped to the minimum MCS index in the low spectral efficiency table regardless of a difference between the desired target spectral efficiency and the spectral efficiency associated with the minimum MCS index in the low spectral efficiency table. Accordingly, some aspects described herein relate to techniques and apparatuses to provide additional MCS reporting resolution in a region below the minimum MCS index in the low spectral efficiency table. In this way, a UE may request a larger RB allocation for a next transmission in order to mitigate transmission problems that may occur in cases where there may be a high residual BLER and/or fading channels with different Doppler and/or delay spreads, among other examples.

As indicated above, FIG. 4 is provided as an example. Other examples may differ from what is described with respect to FIG. 4.

FIG. 5 is a diagram illustrating an example associated with reporting below a minimum MCS, in accordance with the present disclosure. As shown in FIG. 5, example 500 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 5, and by reference number 510, the base station 110 may transmit, and the UE 120 may receive, DCI that includes a downlink grant to schedule a PDSCH and trigger an aperiodic CSI report on a PUCCH based on a decoding result associated with the PDSCH. For example, as described herein, the downlink grant may include one or more fields to indicate a scheduled MCS associated with the PDSCH, which the base station 110 may select based on one or more periodic CSI reports transmitted from the UE 120 to the base station 110. For example, in some aspects, the PDSCH may be associated with a target BLER (e.g., 1e−1 for a new URLLC transmission), and the base station 110 may select the scheduled MCS associated with the PDSCH by determining a spectral efficiency that achieves the target BLER based on CSI measurements included in the one or more periodic CSI reports (e.g., a CQI, a precoding matrix indicator (PMI), a CSI-RS resource indicator (CRI), a layer indicator (LI), and/or a rank indicator (RI), among other examples). Accordingly, the UE 120 may be configured to measure the PDSCH to obtain CSI measurements that relate to downlink channel conditions, which may be included in the aperiodic CSI report. Additionally, or alternatively, the downlink grant may trigger one or more reference signals (e.g., a CSI-RS transmission to the UE 120 prior to the PDSCH) that the UE 120 is to measure to obtain the CSI measurements to be included in the aperiodic CSI report.

In some aspects, as shown by reference number 520, the scheduled MCS associated with the PDSCH may correspond to an MCS index in an MCS table, which generally defines a modulation order, a target code rate, and a spectral efficiency associated with a PDSCH transmission that is performed using the corresponding MCS index. For example, a wireless communication standard may define various MCS tables, which may include a default table (e.g., MCS index table 1) in which a maximum modulation order is 6 (corresponding to 16 QAM), a high spectral efficiency table (e.g., MCS index table 2) in which a maximum modulation order is 8 (corresponding to 256 QAM), and a low spectral efficiency table (e.g., MCS index table 3) that includes one or more MCS indexes associated with spectral efficiencies that are lower than a minimum MCS index in the default table. For example, a minimum MCS index in the default table (MCS 0) is associated with a modulation order of 2, a target code rate of 120, and a spectral efficiency of 0.2344. However, in some cases (e.g., URLLC traffic), a spectral efficiency lower than 0.2344 may be needed in order to satisfy a residual BLER requirement. Accordingly, the low spectral efficiency table may be configured to provide MCS indexes associated with spectral efficiencies below the minimum MCS index in the default table. For example, MCS 0 in the default table may correspond to MCS 6 in the low spectral efficiency table, which includes MCS indexes 0 through 5 to provide greater granularity to increase RB allocations that may satisfy more stringent BLER requirements. Accordingly, some aspects described herein relate to scenarios where the PDSCH scheduled by the DCI is associated with an MCS index in the low spectral efficiency table and the UE 120 needs to request an MCS associated with a spectral efficiency that is lower than a minimum MCS index in the low spectral efficiency table (e.g., a spectral efficiency lower than 0.0586, which is the spectral efficiency associated with MCS 0 in the low spectral efficiency table).

As further shown in FIG. 5, and by reference number 530, the base station 110 may transmit, and the UE 120 may receive, the PDSCH that is scheduled by the DCI and transmitted using the initial (scheduled) MCS indicated in the DCI. In some aspects, the UE 120 may attempt to decode the PDSCH, and may compute an actual BLER associated with the decoded PDSCH. In some aspects, the UE 120 may further determine an MCS to request for a next transmission (e.g., a retransmission of the PDSCH) based on the actual BLER. For example, the UE 120 may need to request a larger RB allocation for the next transmission in order to satisfy a target BLER. Accordingly, the UE 120 may compute a residual or target spectral efficiency that can achieve the target BLER by solving for S in the following equation:

$$N_{RB} = \frac{N_{info}}{L * S * N_{RE}}$$

where $N_{RB}$ is a number of RBs that may satisfy the target BLER, $N_{info}$ is a number of information bits included in the PDSCH transmission (e.g., 256 bits for URLLC traffic), L is the number of layers used to perform the transmission, $N_{RE}$ is a number of REs per RB, and S is the residual or target spectral efficiency that may achieve the target BLER.

As further shown in FIG. 5, and by reference number 540, the UE 120 may transmit a PUCCH that carries CSI feedback indicating an MCS that may satisfy a residual BLER requirement. For example, as described in further detail above with reference to FIG. 4, the CSI feedback may be transmitted in a common PUCCH resource that includes HARQ feedback for the PDSCH in addition to the CSI feedback, or the CSI feedback and the HARQ feedback for the PDSCH may be transmitted in separate PUCCH resources. Furthermore, in cases where the UE 120 computes a spectral efficiency value that is greater than or equal to the spectral efficiency associated with the minimum MCS index in the low spectral efficiency table (e.g., greater than or equal to 0.0586), the CSI feedback may indicate the corresponding MCS index that provides a sufficient RB allocation to achieve the target BLER. Alternatively, in cases where the UE 120 computes a spectral efficiency value below the spectral efficiency associated with the minimum MCS index in the low spectral efficiency table (e.g., less than 0.0586), the CSI feedback may include information to indicate an MCS associated with a spectral efficiency below the spectral efficiency associated with the minimum MCS index in the low spectral efficiency table. For example, in some aspects, the low spectral efficiency table may be extended to include one or more entries that have lower spectral efficiencies than the minimum MCS index (e.g., by using one or more reserved entries to specify MCS indexes associated with spectral efficiencies below the minimum MCS and/or shifting one or more entries such that the low spectral efficiency table can accommodate more entries with more granular spectral efficiency values that are associated with larger RB allocations).

Additionally, or alternatively, in some aspects, a very low spectral efficiency table may be configured, in which case the UE 120 may include an indication in the CSI feedback to indicate whether the reported MCS is below the minimum MCS index in the low spectral efficiency table or greater than or equal to the minimum MCS index in the low spectral efficiency table. For example, in cases where the UE 120 computes a spectral efficiency value greater than or equal to the minimum spectral efficiency in the low spectral efficiency table, the reported MCS may be indicated according to an index in the low spectral efficiency table. On the other hand, in cases where the UE 120 computes a spectral efficiency value below the minimum spectral efficiency in the low spectral efficiency table, the reported MCS may be indicated according to an index in the very low spectral efficiency table. For example, in some aspects, the PUCCH carrying the CSI feedback may include a first stage UCI with a one-bit indication (e.g., a HigherThanMCS0 or BelowMCS0 parameter) that may be set to a first value to indicate that the reported MCS corresponds to an MCS index in the low spectral efficiency table or a second value to indicate that the reported MCS corresponds to an MCS index in the very low spectral efficiency table. In some aspects, a second stage UCI (e.g., using different time and/or frequency resources than the first stage UCI) may then be used to indicate the MCS that the base station 110 is to use for the next PDSCH transmission. For example, in some aspects, the MCS that the base station 110 is to use for the next PDSCH transmission may be indicated according to a delta value that indicates a difference between the scheduled MCS used for the PDSCH and the reported MCS that the base station 110 is to use for the next PDSCH transmission (e.g., using a payload size of fewer than five (5) bits based on the low spectral efficiency table and/or the very low spectral efficiency table including up to thirty-two (32) entries). Additionally, or alternatively, the second stage UCI may include a payload size of five (5) bits to indicate the MCS index in the low or very low spectral efficiency table.

In some aspects, in cases where the CSI feedback transmitted by the UE 120 indicates an MCS associated with a spectral efficiency below the minimum MCS index in the low spectral efficiency table, the aperiodic CSI report carrying the CSI feedback may be structured to provide additional information to ensure that the next PDSCH transmission from the base station 110 satisfies a target BLER. For example, in some aspects, the UE 120 may transmit a PUCCH that includes a first stage UCI to indicate that the requested MCS is associated with a spectral efficiency below the minimum MCS index in the low spectral efficiency table, and the UE 120 may then transmit a second stage UCI (e.g., using different time and/or frequency resources within the same uplink slot or sub-slot as the first stage UCI) that includes additional information to assist the base station 110 in appropriately adapting transmission parameters for the next PDSCH transmission. For example, as shown by reference number 550, the additional information included in the second stage UCI may include a residual number of RBs that the UE 120 requires in addition to the number of RBs that would otherwise be included in a PDSCH if the base station 110 were to use the minimum MCS index in the low spectral efficiency table. For example, in some aspects, the UE 120 may compute a first number of RBs based on a first spectral efficiency that is obtained from an entry in an MCS table (e.g., the low spectral efficiency table or the very low spectral efficiency table) associated with a spectral efficiency value below the minimum MCS index in the low spectral efficiency table and a second number of RBs based on a second spectral efficiency associated with the minimum MCS index in the low spectral efficiency table. In this case, the number of residual RBs is a difference between the first number of RBs and the second number of RBs, and the total number of RBs is the sum of the number of RBs associated with the minimum MCS index in the low spectral efficiency table and the number of residual RBs. In other words, the number of residual RBs reported by the UE 120 may correspond to a difference between a total number of RBs that may achieve the target BLER for the next PDSCH transmission and the number of RBs associated with the minimum MCS index in the low spectral efficiency table. In this way, the base station 110 may compute the total number of RBs to include in the next PDSCH transmission by adding the number of RBs associated with the minimum MCS index in the low spectral efficiency table for a given TB size and the number of residual RBs reported by the UE 120.

Alternatively, as shown by reference number 560, the UE 120 may report a residual spectral efficiency, in which case the UE 120 may report a difference between a total spectral efficiency that may achieve the target BLER and the spectral efficiency associated with the minimum MCS index in the low spectral efficiency table. For example, in some aspects, the UE 120 may use a similar approach as described above with respect to the number of residual RBs to compute the residual spectral efficiency. For example, the UE 120 may determine a first spectral efficiency below the minimum MCS index in the low spectral efficiency table based on a number of RBs that would satisfy a BLER requirement and may determine a second spectral efficiency associated with the minimum MCS index in the low spectral efficiency table. In this case, the difference between the first spectral efficiency and the second spectral efficiency may provide the residual spectral efficiency to be reported to the base station 110. Alternatively, the UE 120 may determine a number of RBs that will achieve a target BLER for a next transmission, and may use the equation provided above to compute a spectral efficiency value that will achieve the target BLER (e.g., 1e−5). The UE 120 may then subtract the spectral efficiency value from the spectral efficiency associated with the minimum MCS index in the low spectral efficiency table to determine the residual spectral efficiency. In such cases, where the reports a residual spectral efficiency, the base station 110 and the UE 120 may exchange additional signaling (e.g., using radio resource control (RRC) messages or a medium access control (MAC) control element (MAC-CE)) to establish a quantization level and resolution associated with the residual spectral efficiency. For example, whereas the number of residual RBs can be reported as an integer value, spectral efficiency is computed within a continuous range, whereby the base station 110 and the UE 120 may need to agree on the quantization level and resolution associated with the residual spectral efficiency reported in the CSI feedback.

As further shown in FIG. 5, and by reference number 570, the base station 110 may transmit, and the UE 120 may receive, a PDSCH transmission (e.g., a PDSCH carrying a new TB or a retransmission of the TB carried in the previous PDSCH) that includes a number of RBs to satisfy a target BLER. For example, as shown in FIG. 5 and described herein, the base station 110 may determine the MCS for the PDSCH transmission based on the MCS indicated in the CSI feedback, which may be mapped to an MCS in a low spectral efficiency table or to an MCS that has a spectral efficiency below the minimum MCS index in the low spectral efficiency table. In the latter case, where the MCS indicated in the CSI feedback is associated with a spectral efficiency below the minimum MCS index in the low spectral efficiency table, the base station 110 may determine the number of residual RBs and/or the residual spectral efficiency for the PDSCH transmission relative to the minimum MCS index in the low spectral efficiency table. In this way, the UE 120 may request a larger RB allocation than is otherwise possible using the minimum MCS index in the low spectral efficiency table, which may increase reliability by lowering a BLER for PDSCH communications (e.g., in cases where there may be a high Doppler and/or delay spread).

As indicated above, FIG. 5 is provided as an example. Other examples may differ from what is described with respect to FIG. 5.

Figure 6:
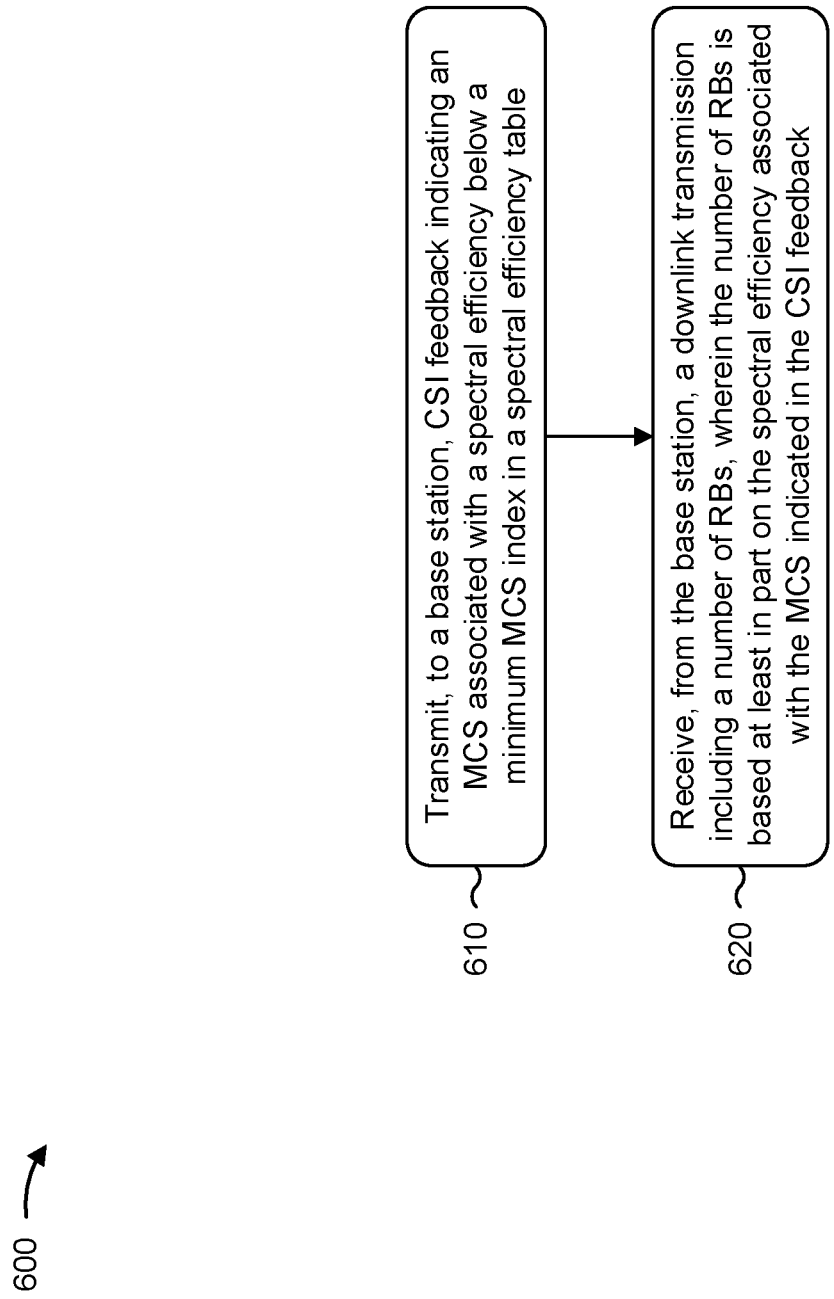
FIGS. 6-7 are diagrams illustrating example processes associated with reporting below a minimum MCS, in accordance with the present disclosure.

FIG. 6 is a diagram illustrating an example process 600 performed, for example, by a UE, in accordance with the present disclosure. Example process 600 is an example where the UE (e.g., UE 120) performs operations associated with reporting below a minimum MCS.

As shown in FIG. 6, in some aspects, process 600 may include transmitting, to a base station, CSI feedback indicating an MCS associated with a spectral efficiency below a minimum MCS index in a spectral efficiency table (block 610). For example, the UE (e.g., using communication manager 140 and/or transmission component 804, depicted in FIG. 8) may transmit, to a base station, CSI feedback indicating an MCS associated with a spectral efficiency below a minimum MCS index in a spectral efficiency table, as described above.

As further shown in FIG. 6, in some aspects, process 600 may include receiving, from the base station, a downlink transmission including a number of RBs, wherein the number of RBs is based at least in part on the spectral efficiency associated with the MCS indicated in the CSI feedback (block 620). For example, the UE (e.g., using communication manager 140 and/or reception component 802, depicted in FIG. 8) may receive, from the base station, a downlink transmission including a number of RBs, wherein the number of RBs is based at least in part on the spectral efficiency associated with the MCS indicated in the CSI feedback, as described above.

Process 600 may include additional aspects, such as any single aspect or any combination of aspects described below and/or in connection with one or more other processes described elsewhere herein.

In a first aspect, the MCS indicated in the CSI feedback is mapped to an entry, in the spectral efficiency table, that is included among one or more entries associated with lower spectral efficiencies than the minimum MCS index.

In a second aspect, alone or in combination with the first aspect, the MCS indicated in the CSI feedback is mapped to an entry in a very low spectral efficiency table that includes one or more entries associated with lower spectral efficiencies than the minimum MCS index in the spectral efficiency table.

In a third aspect, alone or in combination with one or more of the first and second aspects, the CSI feedback includes a one-bit field to indicate that the very low spectral efficiency table is used to indicate the MCS.

In a fourth aspect, alone or in combination with one or more of the first through third aspects, the entry in the very low spectral efficiency table mapped to the MCS is indicated in a UCI field.

In a fifth aspect, alone or in combination with one or more of the first through fourth aspects, the CSI feedback includes a delta MCS value to indicate the MCS associated with the spectral efficiency below the minimum MCS index in the spectral efficiency table.

In a sixth aspect, alone or in combination with one or more of the first through fifth aspects, the MCS indicated in the CSI feedback is based at least in part on a PDSCH decoding result.

In a seventh aspect, alone or in combination with one or more of the first through sixth aspects, the CSI feedback includes a first stage UCI to indicate that the MCS is associated with the spectral efficiency below the minimum MCS index in the spectral efficiency table and a second stage UCI to indicate one or more parameters related to the number of RBs to be included in the downlink transmission from the base station.

In an eighth aspect, alone or in combination with one or more of the first through seventh aspects, the one or more parameters indicated in the second stage UCI include a residual number of RBs to add to a number of RBs associated with the minimum MCS index in the spectral efficiency table.

In a ninth aspect, alone or in combination with one or more of the first through eighth aspects, the one or more parameters indicated in the second stage UCI include a residual spectral efficiency to add to a spectral efficiency associated with the minimum MCS index in the spectral efficiency table.

In a tenth aspect, alone or in combination with one or more of the first through ninth aspects, the MCS associated with the spectral efficiency below the minimum MCS index in the spectral efficiency table is selected to satisfy a target BLER for the downlink transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
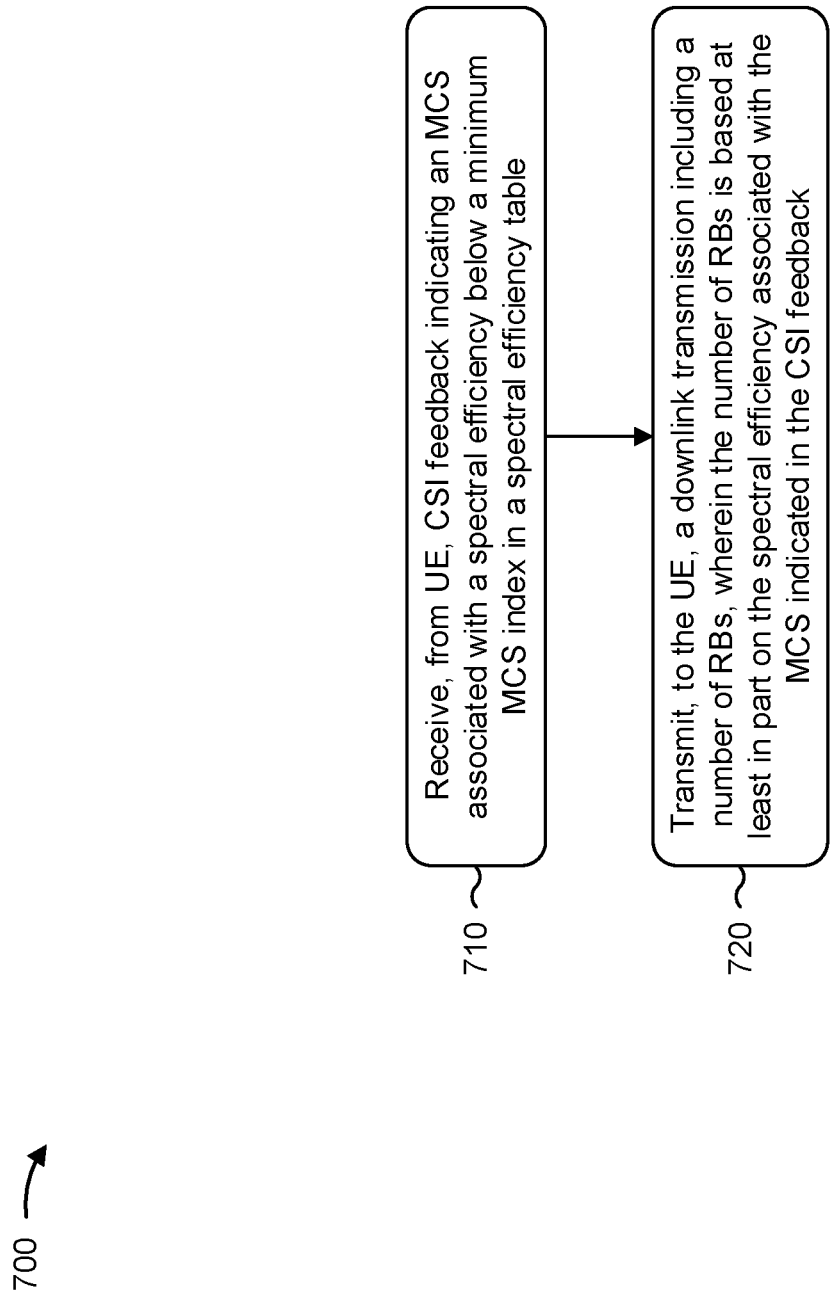

FIG. 7 is a diagram illustrating an example process 700 performed, for example, by a base station, in accordance with the present disclosure. Example process 700 is an example where the base station (e.g., base station 110) performs operations associated with reporting below a minimum MCS.

As shown in FIG. 7, in some aspects, process 700 may include receiving, from a UE, CSI feedback indicating an MCS associated with a spectral efficiency below a minimum MCS index in a spectral efficiency table (block 710). For example, the base station (e.g., using communication manager 150 and/or reception component 902, depicted in FIG. 9) may receive, from a UE, CSI feedback indicating an MCS associated with a spectral efficiency below a minimum MCS index in a spectral efficiency table, as described above.

As further shown in FIG. 7, in some aspects, process 700 may include transmitting, to the UE, a downlink transmission including a number of RBs, wherein the number of RBs is based at least in part on the spectral efficiency associated with the MCS indicated in the CSI feedback (block 720). For example, the base station (e.g., using communication manager 150 and/or transmission component 904, depicted in FIG. 9) may transmit, to the UE, a downlink transmission including a number of RBs, wherein the number of RBs is based at least in part on the spectral efficiency associated with the MCS indicated in the CSI feedback, as described above.

Process 700 may include additional aspects, such as any single aspect or any combination of aspects described below and/or in connection with one or more other processes described elsewhere herein.

In a first aspect, the MCS indicated in the CSI feedback is mapped to an entry, in the spectral efficiency table, that is included among one or more entries associated with lower spectral efficiencies than the minimum MCS index.

In a second aspect, alone or in combination with the first aspect, the MCS indicated in the CSI feedback is mapped to an entry in a very low spectral efficiency table that includes one or more entries associated with lower spectral efficiencies than the minimum MCS index in the spectral efficiency table.

In a third aspect, alone or in combination with one or more of the first and second aspects, the CSI feedback includes a one-bit field to indicate that the very low spectral efficiency table is used to indicate the MCS.

In a fourth aspect, alone or in combination with one or more of the first through third aspects, the entry in the very low spectral efficiency table mapped to the MCS is indicated in a UCI field.

In a fifth aspect, alone or in combination with one or more of the first through fourth aspects, the CSI feedback includes a delta MCS value to indicate the MCS associated with the spectral efficiency below the minimum MCS index in the spectral efficiency table.

In a sixth aspect, alone or in combination with one or more of the first through fifth aspects, the MCS indicated in the CSI feedback is based at least in part on a PDSCH decoding result.

In a seventh aspect, alone or in combination with one or more of the first through sixth aspects, the CSI feedback includes a first stage UCI to indicate that the MCS is associated with the spectral efficiency below the minimum MCS index in the spectral efficiency table and a second stage UCI to indicate one or more parameters related to the number of RBs to be included in the downlink transmission from the base station.

In an eighth aspect, alone or in combination with one or more of the first through seventh aspects, the one or more parameters indicated in the second stage UCI include a residual number of RBs to add to a number of RBs associated with the minimum MCS index in the spectral efficiency table.

In a ninth aspect, alone or in combination with one or more of the first through eighth aspects, the one or more parameters indicated in the second stage UCI include a residual spectral efficiency to add to a spectral efficiency associated with the minimum MCS index in the spectral efficiency table.

In a tenth aspect, alone or in combination with one or more of the first through ninth aspects, the MCS associated with the spectral efficiency below the minimum MCS index in the spectral efficiency table is selected to satisfy a target BLER for the downlink transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
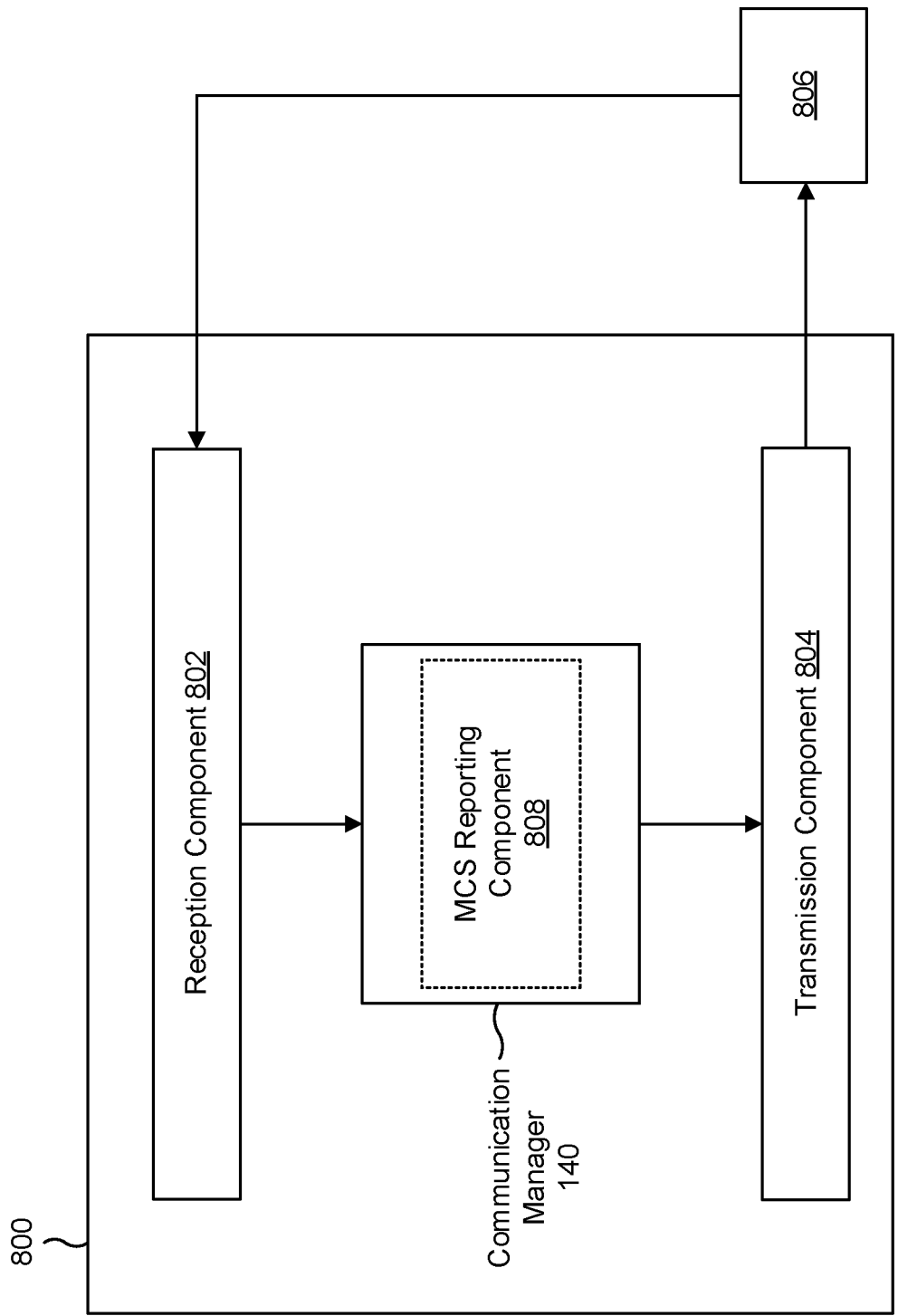
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include an MCS reporting component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The transmission component 804 may transmit, to a base station, CSI feedback indicating an MCS associated with a spectral efficiency below a minimum MCS index in a spectral efficiency table. The reception component 802 may receive, from the base station, a downlink transmission including a number of RBs, wherein the number of RBs is based at least in part on the spectral efficiency associated with the MCS indicated in the CSI feedback.

The MCS reporting component 808 may map the MCS indicated in the CSI feedback to an entry, in the spectral efficiency table, that is included among one or more entries associated with lower spectral efficiencies than the minimum MCS index.

The MCS reporting component 808 may map the MCS indicated in the CSI feedback to an entry in a very low spectral efficiency table that includes one or more entries associated with lower spectral efficiencies than the minimum MCS index in the spectral efficiency table.

The MCS reporting component 808 may report CSI feedback that includes a delta MCS value to indicate the MCS associated with the spectral efficiency below the minimum MCS index in the spectral efficiency table.

The MCS reporting component 808 may report CSI feedback that includes a first stage UCI to indicate that the MCS is associated with the spectral efficiency below the minimum MCS index in the spectral efficiency table and a second stage UCI to indicate one or more parameters related to the number of RBs to be included in the downlink transmission from the base station.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
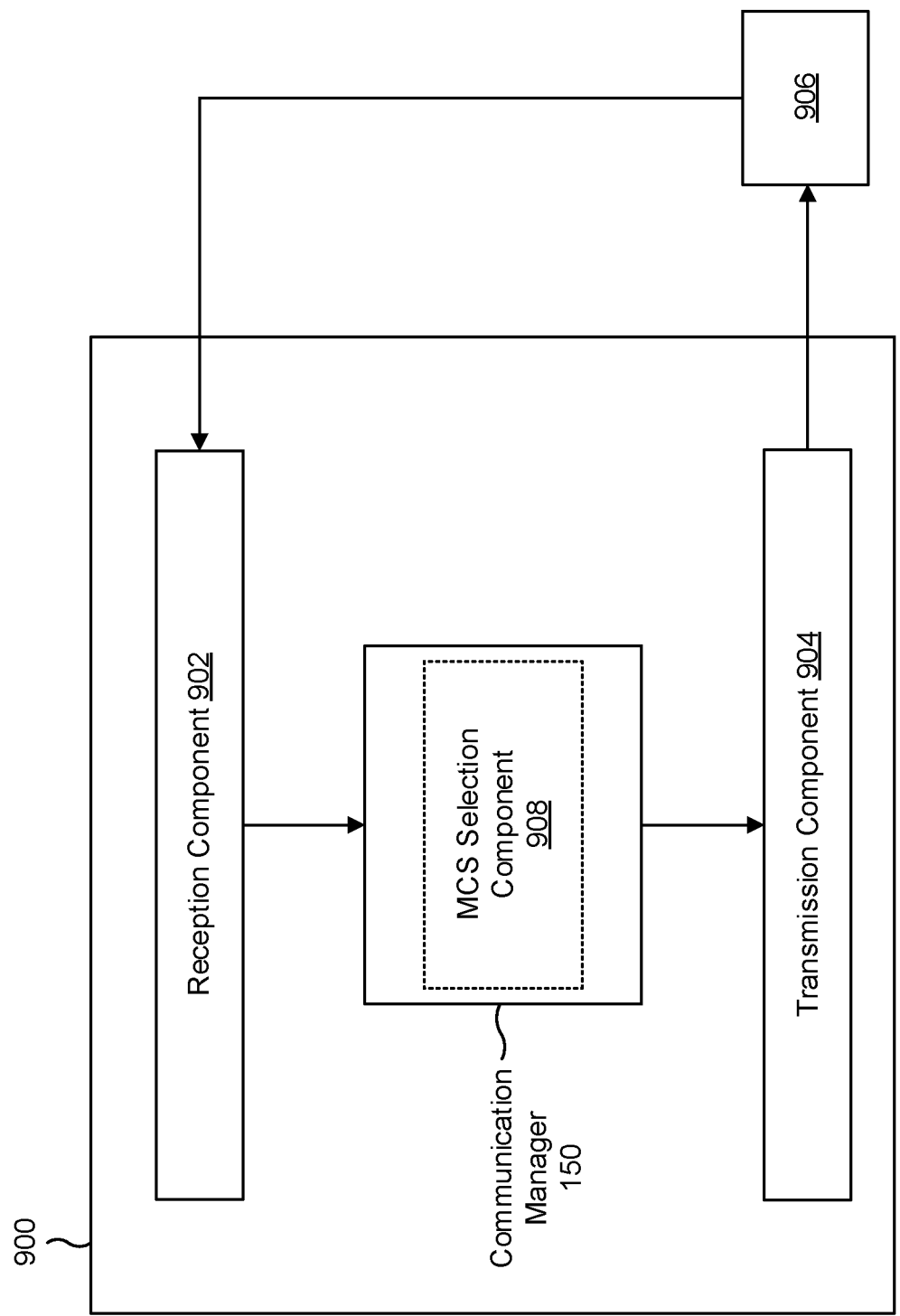

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include an MCS selection component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The reception component 902 may receive, from a UE, CSI feedback indicating an MCS associated with a spectral efficiency below a minimum MCS index in a spectral efficiency table. The transmission component 904 may transmit, to the UE, a downlink transmission including a number of RBs, wherein the number of RBs is based at least in part on the spectral efficiency associated with the MCS indicated in the CSI feedback.

The MCS selection component 908 may map the MCS indicated in the CSI feedback to an entry, in the spectral efficiency table, that is included among one or more entries associated with lower spectral efficiencies than the minimum MCS index.

The MCS selection component 908 may map the MCS indicated in the CSI feedback to an entry in a very low spectral efficiency table that includes one or more entries associated with lower spectral efficiencies than the minimum MCS index in the spectral efficiency table.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: transmitting, to a base station, CSI feedback indicating an MCS associated with a spectral efficiency below a minimum MCS index in a spectral efficiency table; and receiving, from the base station, a downlink transmission including a number of RBs, wherein the number of RBs is based at least in part on the spectral efficiency associated with the MCS indicated in the CSI feedback.

Aspect 2: The method of Aspect 1, wherein the MCS indicated in the CSI feedback is mapped to an entry, in the spectral efficiency table, that is included among one or more entries associated with lower spectral efficiencies than the minimum MCS index.

Aspect 3: The method of Aspect 1, wherein the MCS indicated in the CSI feedback is mapped to an entry in a very low spectral efficiency table that includes one or more entries associated with lower spectral efficiencies than the minimum MCS index in the spectral efficiency table.

Aspect 4: The method of Aspect 3, wherein the CSI feedback includes a one-bit field to indicate that the very low spectral efficiency table is used to indicate the MCS.

Aspect 5: The method of any of Aspects 3-4, wherein the entry in the very low spectral efficiency table mapped to the MCS is indicated in a UCI field.

Aspect 6: The method of any of Aspects 1-5, wherein the CSI feedback includes a delta MCS value to indicate the MCS associated with the spectral efficiency below the minimum MCS index in the spectral efficiency table.

Aspect 7: The method of any of Aspects 1-6, wherein the MCS indicated in the CSI feedback is based at least in part on a PDSCH decoding result.

Aspect 8: The method of any of Aspects 1-7, wherein the CSI feedback includes a first stage UCI to indicate that the MCS is associated with the spectral efficiency below the minimum MCS index in the spectral efficiency table and a second stage UCI to indicate one or more parameters related to the number of RBs to be included in the downlink transmission from the base station.

Aspect 9: The method of Aspect 8, wherein the one or more parameters indicated in the second stage UCI include a residual number of RBs to add to a number of RBs associated with the minimum MCS index in the spectral efficiency table.

Aspect 10: The method of Aspect 8, wherein the one or more parameters indicated in the second stage UCI include a residual spectral efficiency to add to a spectral efficiency associated with the minimum MCS index in the spectral efficiency table.

Aspect 11: The method of any of Aspects 1-10, wherein the MCS associated with the spectral efficiency below the minimum MCS index in the spectral efficiency table is selected to satisfy a target BLER for the downlink transmission.

Aspect 12: A method of wireless communication performed by a base station, comprising: receiving, from a UE, CSI feedback indicating an MCS associated with a spectral efficiency below a minimum MCS index in a spectral efficiency table; and transmitting, to the UE, a downlink transmission including a number of RBs, wherein the number of RBs is based at least in part on the spectral efficiency associated with the MCS indicated in the CSI feedback.

Aspect 13: The method of Aspect 12, wherein the MCS indicated in the CSI feedback is mapped to an entry, in the spectral efficiency table, that is included among one or more entries associated with lower spectral efficiencies than the minimum MCS index.

Aspect 14: The method of Aspect 12, wherein the MCS indicated in the CSI feedback is mapped to an entry in a very low spectral efficiency table that includes one or more entries associated with lower spectral efficiencies than the minimum MCS index in the spectral efficiency table.

Aspect 15: The method of Aspect 14, wherein the CSI feedback includes a one-bit field to indicate that the very low spectral efficiency table is used to indicate the MCS.

Aspect 16: The method of any of Aspects 14-15, wherein the entry in the very low spectral efficiency table mapped to the MCS is indicated in a UCI field.

Aspect 17: The method of any of Aspects 12-16, wherein the CSI feedback includes a delta MCS value to indicate the MCS associated with the spectral efficiency below the minimum MCS index in the spectral efficiency table.

Aspect 18: The method of any of Aspects 12-17, wherein the MCS indicated in the CSI feedback is based at least in part on a PDSCH decoding result.

Aspect 19: The method of any of Aspects 12-18, wherein the CSI feedback includes a first stage UCI to indicate that the MCS is associated with the spectral efficiency below the minimum MCS index in the spectral efficiency table and a second stage UCI to indicate one or more parameters related to the number of RBs to be included in the downlink transmission from the base station.

Aspect 20: The method of Aspect 19, wherein the one or more parameters indicated in the second stage UCI include a residual number of RBs to add to a number of RBs associated with the minimum MCS index in the spectral efficiency table.

Aspect 21: The method of Aspect 19, wherein the one or more parameters indicated in the second stage UCI include a residual spectral efficiency to add to a spectral efficiency associated with the minimum MCS index in the spectral efficiency table.

Aspect 22: The method of any of Aspects 12-21, wherein the MCS associated with the spectral efficiency below the minimum MCS index in the spectral efficiency table is selected to satisfy a target BLER for the downlink transmission.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting, to a base station, channel state information (CSI) feedback indicating a modulation and coding scheme (MCS) associated with a spectral efficiency below a minimum MCS index in a spectral efficiency table;
    wherein the CSI feedback comprises a first stage uplink control information (UCI) to indicate an MCS index in the spectral efficiency table, and a second stage UCI to indicate one or more parameters related to the number of resource blocks (RB) to be included in downlink transmissions from the base station; and
    receiving, from the base station, a downlink transmission including a number of resource blocks (RBs), wherein the number of RBs is based at least in part on the spectral efficiency associated with the MCS indicated in the CSI feedback.

2. The method of claim 1, wherein the MCS indicated in the CSI feedback is associated with lower spectral efficiencies than the minimum MCS index.

3. The method of claim 1, wherein the MCS indicated in the CSI feedback is mapped to an entry in a very low spectral efficiency table that includes one or more entries associated with lower spectral efficiencies than the minimum MCS index in the spectral efficiency table.

4. The method of claim 3, wherein the CSI feedback includes a one-bit field to indicate that the very low spectral efficiency table is used to indicate the MCS.

5. The method of claim 3, wherein the entry in the very low spectral efficiency table mapped to the MCS is indicated in an uplink control information (UCI) field.

6. The method of claim 1, wherein the CSI feedback includes a delta MCS value to indicate the MCS associated with the spectral efficiency below the minimum MCS index in the spectral efficiency table.

7. The method of claim 1, wherein the MCS indicated in the CSI feedback is based at least in part on a physical downlink shared channel decoding result.

8. The method of claim 1, wherein the one or more parameters indicated in the second stage UCI include a residual number of RBs to add to a number of RBs associated with the minimum MCS index in the spectral efficiency table.

9. The method of claim 1, wherein the one or more parameters indicated in the second stage UCI include a residual spectral efficiency to add to a spectral efficiency associated with the minimum MCS index in the spectral efficiency table.

10. The method of claim 1, wherein the MCS associated with the spectral efficiency below the minimum MCS index in the spectral efficiency table is selected to satisfy a target block error rate (BLER) for the downlink transmission.

11. The method of claim 1, wherein the first stage UCI indicates the minimum MCS index in the spectral efficiency table.

12. A method of wireless communication performed by a base station, comprising:
receiving, from a user equipment (UE), channel state information (CSI) feedback indicating a modulation and coding scheme (MCS) associated with a spectral efficiency below a minimum MCS index in a spectral efficiency table;
wherein the CSI feedback comprises a first stage uplink control information (UCI) to indicate an MCS index in the spectral efficiency table, and a second stage UCI to indicate one or more parameters related to the number of resource blocks (RB) to be included in downlink transmissions from the base station; and
transmitting, to the UE, a downlink transmission including a number of resource blocks (RBs), wherein the number of RBs is based at least in part on the spectral efficiency associated with the MCS indicated in the CSI feedback.

13. The method of claim 12, wherein the MCS indicated in the CSI feedback is associated with lower spectral efficiencies than the minimum MCS index.

14. The method of claim 12, wherein the MCS indicated in the CSI feedback is mapped to an entry in a very low spectral efficiency table that includes one or more entries associated with lower spectral efficiencies than the minimum MCS index in the spectral efficiency table.

15. The method of claim 14, wherein the CSI feedback includes a one-bit field to indicate that the very low spectral efficiency table is used to indicate the MCS.

16. The method of claim 14, wherein the entry in the very low spectral efficiency table mapped to the MCS is indicated in an uplink control information (UCI) field.

17. The method of claim 12, wherein the CSI feedback includes a delta MCS value to indicate the MCS associated with the spectral efficiency below the minimum MCS index in the spectral efficiency table.

18. The method of claim 12, wherein the MCS indicated in the CSI feedback is based at least in part on a physical downlink shared channel decoding result.

19. The method of claim 12, wherein the one or more parameters indicated in the second stage UCI include a residual number of RBs to add to a number of RBs associated with the minimum MCS index in the spectral efficiency table.

20. The method of claim 12, wherein the one or more parameters indicated in the second stage UCI include a residual spectral efficiency to add to a spectral efficiency associated with the minimum MCS index in the spectral efficiency table.

21. The method of claim 12, wherein the MCS associated with the spectral efficiency below the minimum MCS index in the spectral efficiency table is selected to satisfy a target block error rate (BLER) for the downlink transmission.

22. The method of claim 12, wherein the first stage UCI indicates the minimum MCS index in the spectral efficiency table.

23. A user equipment (UE) for wireless communication, comprising:
a memory; and
one or more processors, coupled to the memory, configured to:
transmit, to a base station, channel state information (CSI) feedback indicating a modulation and coding scheme (MCS) associated with a spectral efficiency below a minimum MCS index in a spectral efficiency table;
wherein the CSI feedback comprises a first stage uplink control information (UCI) to indicate an MCS index in the spectral efficiency table, and a second stage UCI to indicate one or more parameters related to the number of resource blocks (RB) to be included in downlink transmissions from the base station; and
receive, from the base station, a downlink transmission including a number of resource blocks (RBs), wherein the number of RBs is based at least in part on the spectral efficiency associated with the MCS indicated in the CSI feedback.

24. The UE of claim 23, wherein the MCS indicated in the CSI feedback is associated with lower spectral efficiencies than the minimum MCS index.

25. The UE of claim 23, wherein the MCS indicated in the CSI feedback is mapped to an entry in a very low spectral efficiency table that includes one or more entries associated with lower spectral efficiencies than the minimum MCS index in the spectral efficiency table.

26. The UE of claim 23, wherein the CSI feedback includes a delta MCS value to indicate the MCS associated with the spectral efficiency below the minimum MCS index in the spectral efficiency table.

27. A base station for wireless communication, comprising:
a memory; and
one or more processors, coupled to the memory, configured to:

receive, from a user equipment (UE), channel state information (CSI) feedback indicating a modulation and coding scheme (MCS) associated with a spectral efficiency below a minimum MCS index in a spectral efficiency table;

wherein the CSI feedback comprises a first stage uplink control information (UCI) to indicate an MCS index in the spectral efficiency table, and a second stage UCI to indicate one or more parameters related to the number of resource blocks (RB) to be included in downlink transmissions from the base station; and transmit, to the UE, a downlink transmission including a number of resource blocks (RBs), wherein the number of RBs is based at least in part on the spectral efficiency associated with the MCS indicated in the CSI feedback.

28. The base station of claim 27, wherein the MCS indicated in the CSI feedback is associated with lower spectral efficiencies than the minimum MCS index.

29. The base station of claim 27, wherein the MCS indicated in the CSI feedback is mapped to an entry in a very low spectral efficiency table that includes one or more entries associated with lower spectral efficiencies than the minimum MCS index in the spectral efficiency table.

30. The base station of claim 27, wherein the CSI feedback includes a delta MCS value to indicate the MCS associated with the spectral efficiency below the minimum MCS index in the spectral efficiency table.

* * * * *